Oct. 6, 1942.　　　　　H. ALLEN　　　　　2,297,678
PRESSURE GAUGE
Filed July 2, 1937　　　　　3 Sheets—Sheet 2
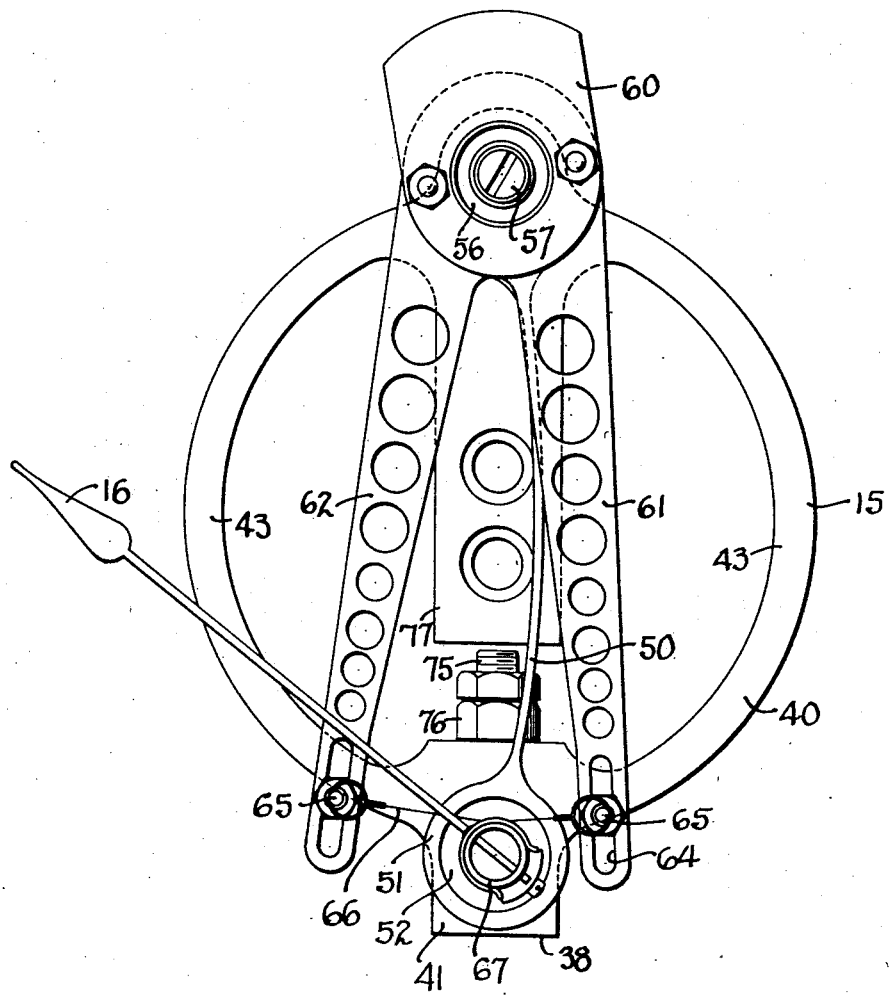
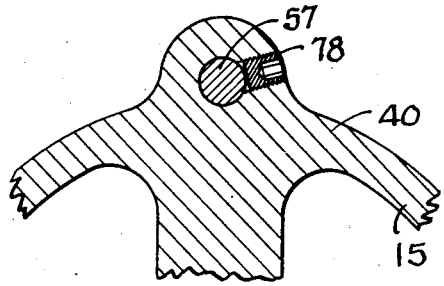
HERBERT ALLEN.
INVENTOR
BY Jesse R. Stone
　　Lester B. Clark
ATTORNEYS.

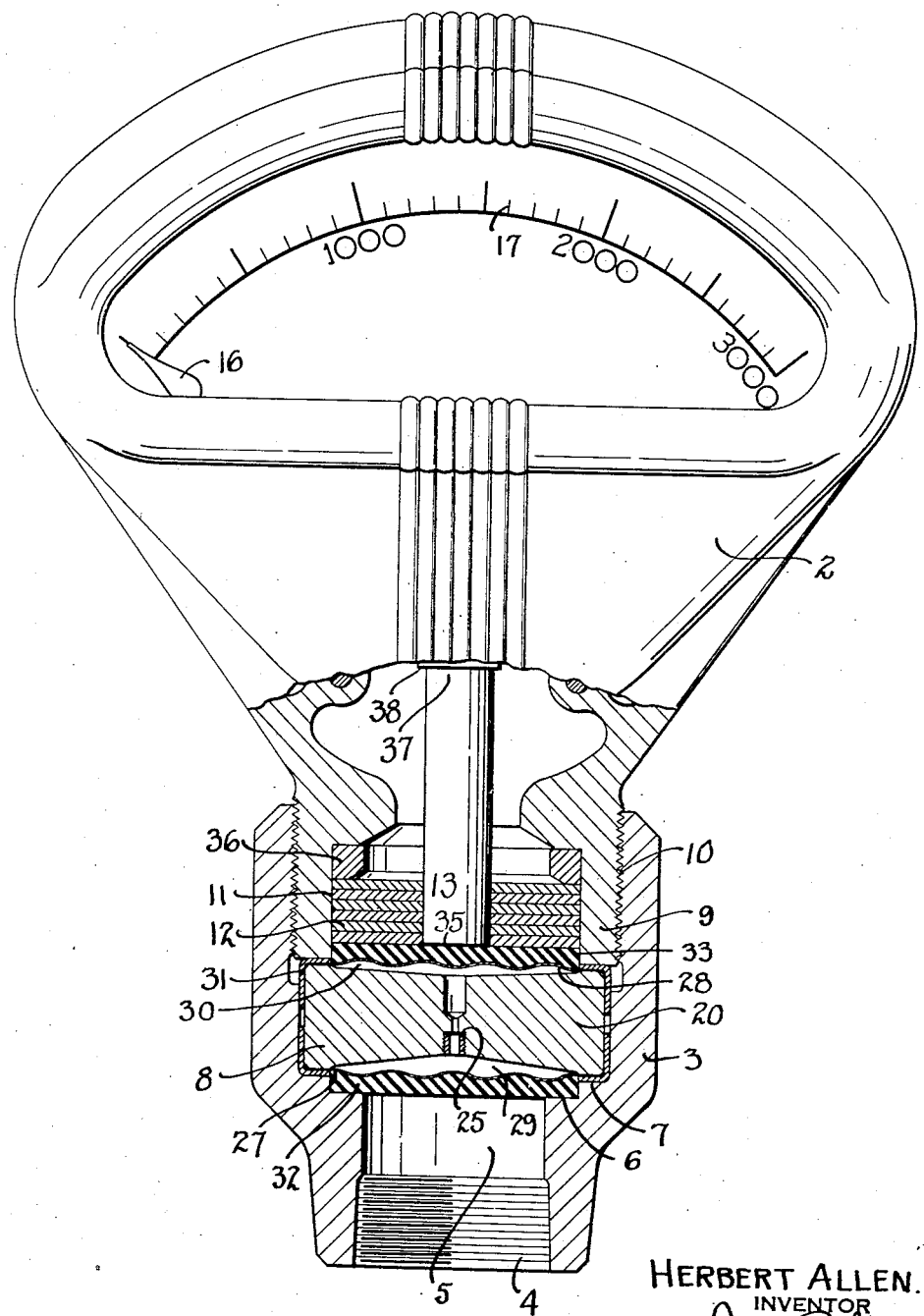

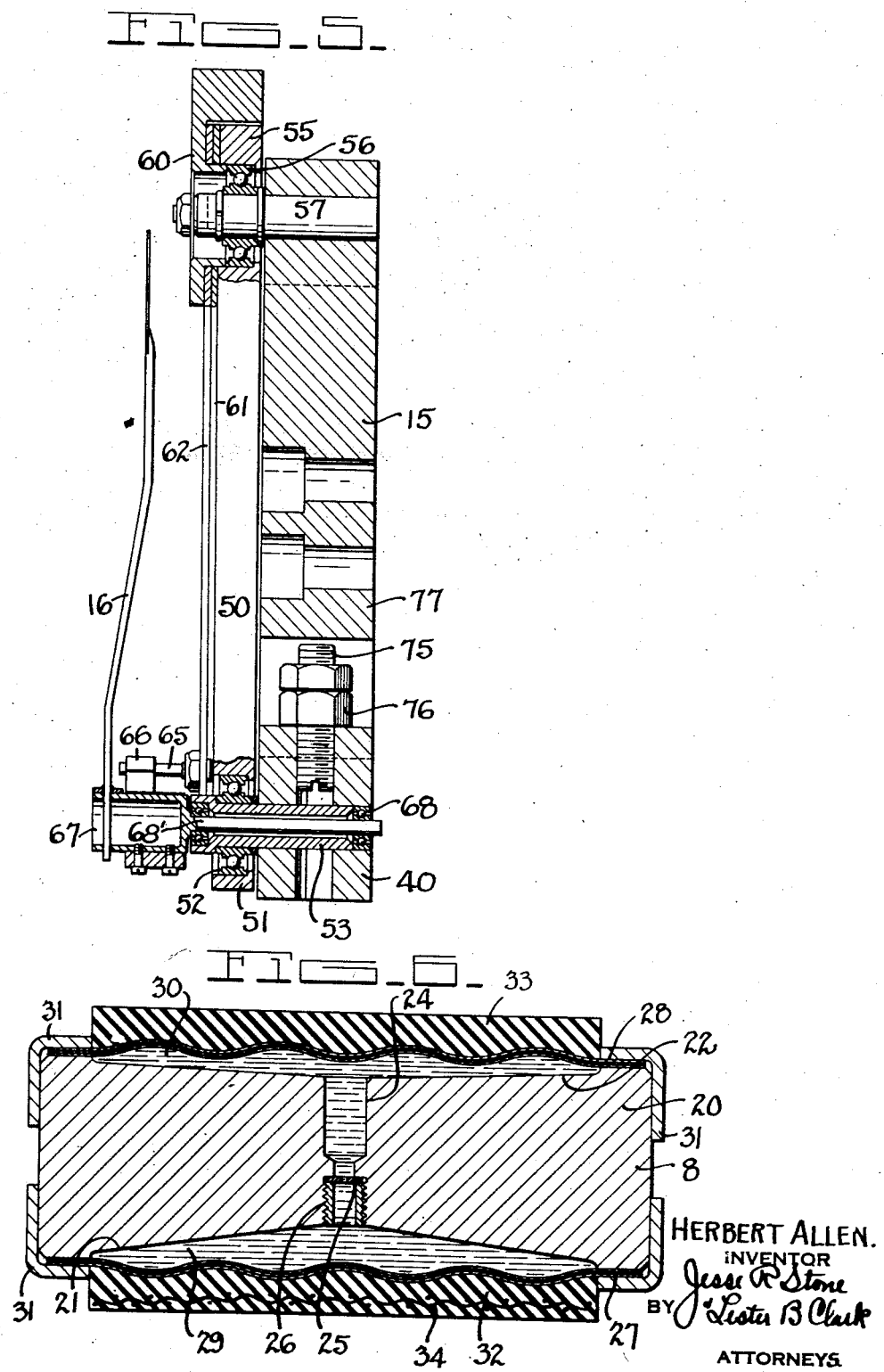

Patented Oct. 6, 1942

2,297,678

UNITED STATES PATENT OFFICE 2,297,678

PRESSURE GAUGE

Herbert Allen, Houston, Tex., assignor to Abercrombie Pump Company, Houston, Tex., a corporation Application July 2, 1937, Serial No. 151,658

18 Claims. (Cl. 73—110)

The invention relates to a diaphragm pressure gauge, particularly of the type which is adapted to indicate relatively high pressures.

It is one of the objects of the invention to provide a pressure gauge wherein an indicator is operated by the flexing of a strut member due to variations in pressure.

Another object of the invention is to provide a annular ring-like member which can be distorted as an indication of the pressure applied thereto.

Another object of the invention is to provide a strut member having an operating mechanism connected thereto so that the amount of flexing of the strut will indicate the pressure applied thereto.

Still another object of the invention is to provide a diaphragm arrangement for pressure gauges wherein fluctuations in pressure are damped by choking the flow of a liquid.

Still another object of the invention is to provide a pair of spaced diaphragms which will move in accordance with the pressure applied thereto by which movement is damped by a flow of liquid between the diaphragms.

Another object of the invention is to provide a housing for clamping the diaphragms in position so that a load pin will be operated in accordance with the movement of the diaphragm.

It is also an object of the invention to provide for movement of the load pin by supplying plates which will move with the load pin to eliminate relative motion between the pin and its surrounding structure.

Another object of the invention is to provide disc members to move with the load pin in order to avoid relative movement which would cause friction losses.

Still another object is to provide a pressure gauge wherein the pressure being gauged may be applied to load the pin of the gauge and to the portion surrounding such pin so that the pin and its adjacent structure are movable independently but substantially the same amount.

Other and further objects of the invention will be readily apparent when the following description is considered in connection with the accompanying drawings wherein:

Fig. 1 is a front elevation of a diaphragm pressure gauge constructed in accordance with the invention and showing certain of the parts in section.

Fig. 2 is a front elevation of the compression mechanism and the indicator which may be used with the gauge.

Fig. 3 is an elevation of one of the studs used in the compression member.

Fig. 4 is a vertical section showing the manner of attaching the stud in the pressure member.

Fig. 5 is a vertical section through the compression mechanism and indicator along a vertical line through the center of Fig. 2.

Fig. 6 is a vertical section of the diaphragm unit.

In Fig. 1 the diaphragm pressure gauge housing is indicated generally at 2 and includes the base coupling 3, which is threaded at 4 to receive the pipe or conduit carrying the pressure which is to be gauged. This coupling has the passage 5 therethrough, which is of different diameters in order to provide the shoulders 6 and 7. These shoulders are arranged to receive the diaphragm unit 8, which is best seen in enlarged section in Fig. 6.

This diaphragm unit is in turn held in position by the pin member 9 of the housing 2, which is threaded at 10 into the upper end of the base coupling 3. This pin member is hollow to provide a recess 11, which is arranged to receive the upper portion of the diaphragm unit 8 and to also receive a plurality of retainer discs 12 which encircle the load pin or rod 13. This rod extends upwardly into the housing 2 and will abut against the compression unit 15, which is best seen in Figs. 2 and 5. The movement of this load pin 13 applies pressure to the unit 15 in order to move the indicator mechanism 16 which will move along the dial 17 in order to indicate the applied pressure. It seems obvious that this dial 17 may be calibrated into any desired unit. The diaphragm unit 8, as seen in Fig. 6, comprises a solid body portion 20 which is provided with a recess 21 in its base and a somewhat similar recess 22 in its top. These two recesses are in turn connected by a passage 24 leading through the central portion of the body 20. This passage 24 is in turn provided with an orifice plate or choke 25, which is held in position by the nipple 26. The recesses 21 and 22 are covered by the diaphragms 27 and 28, respectively, in order to provide the chambers 29 on the bottom and 30 on the top. As seen in Fig. 6, these chambers are filled with any suitable liquid so as to support the diaphragms 27 and 28 in the position as shown. These diaphragms may be of any suitable material which will withstand the pressures and which will move due to variation in pressure thereon. The diaphragms are held in position on the body 20 by means of the clamp rings 31, one of which holds each of the diaphragms in position.

In order to have a device of this sort of a more or less sensitive character, the diaphragms are of relatively thin material and in order to properly support them so that the movement thereof can be uniformly distributed and in order to reenforce the diaphragms to withstand the pressure a resilient plate 32 has been positioned over the diaphragm 27 and a somewhat similar plate 33 positioned over the diaphragm 28. These plates may be of any desired resilient material and may be reenforced by suitable fabric as at 34, in the plate 32.

In operation the pressure will be applied through the passage 5 to the lower plate 32 and thence to the diaphragm 27 and the liquid within the chambers 29 and 30. Pressure applied to this lower diaphragm tends to drive the liquid through the orifice or choke 25 from the chamber 29 upwardly into the chamber 30. This in turn causes flexing of the upper diaphragm 28 and the distribution of this pressure throughout the resilient plate 33.

As seen in Fig. 1, this upper plate 33 is completely confined within the recess 11 by the retainer discs 12 and the lower end 35 of the load pin 13. In this manner any flexing applied to the diaphragm 28 will be uniformly distributed against these retainer discs and the load pin. It will be observed that the discs 12 fit rather snugly about the periphery of the pin and that any movement imparted to the diaphragm 28 will be distributed uniformly through the resilient plate 33 and thence to the retainer discs and the load pin. These retainer discs will in turn flex with the diaphragm so that the apertured center portion thereof will negotiate the same movement as does the load pin 13. The arrangement just described as to the load pin 13 and the flexible disc or discs thereabout eliminates practically all friction insofar as the load pin is concerned. Thus if a stuffing box or other stationary sealing means were provided there would be friction with the pin upon movement of the pin. The pin can be compared to a piston moving in a cylinder where the cylinder bore would create a friction with the piston. In the present case, however, the discs 12, due to the aperture in the center, will flex under the pressure being gauged and they are so constructed and held in place that the flexing of the plates or discs under pressure where they surround the load pin 13, will be substantially the same as the amount of movement imparted to the load pin by this same pressure being gauged. The result is that the pin or piston and the bore or cylinder of the discs will move the same amount. The discs are unattached to the pin or piston and move entirely independently thereof but still in unison with the pin. These discs are held firmly in position at the outer periphery by the retainer ring 36 in housing 2 so that in this manner as the plates flex or move about the center portion there will be no frictional resistance to the sliding movement of the loading pin 13 and a more accurate transmission of the pressure is in this manner obtained. The sealing plate 33 prevents the escape of pressure around the outer periphery of the discs or along the load pin through the aperture in the discs or plates.

In Fig. 1 the upper end 37 of the load pin is shown as abutting the compression member 38, which is on the lower end of compression unit 15, as best seen in Fig. 2.

The compression unit 15 is made up of a ring member 40 which may be of suitable spring steel or other material which is adapted to flex when pressure is applied diametrically thereof. The lug 41 on the lower end thereof is arranged to receive the pressure and any movement of this lug will cause distortion of the sides 43 of this ring member 40 because the top of the ring will be confined and abut against the housing 2.

When pressure is applied to the load pin 13 the ring member 40 will tend to flatten out in accordance with the amount of pressure applied.

In order to take advantage of this movement of the ring member so that it may be translated as an indication of the applied pressure, a slightly bowed strut member 50 has been positioned diametrically across the ring member 40 in a vertical position so that when the ring flattens the strut 50 will be flexed or bent as seen in Fig. 2. The flexing of this strut 50 is caused by virtue of the fact that it has an enlarged hub or ring 51 on the lower part thereof which fits about a bearing 52 which is in turn mounted upon the stud or pin 53. This pin is fixed within the compression ring 40 as best seen in Fig. 5. The upper end of the strut 50 also carries a hub or ring 55 which carries a bearing 56, which in turn is seated upon the stud 57, mounted in the top of the compression ring. With this construction, as the ring flattens out there will be no tendency to turn the strut 50 at either end thereof due to these anti-friction bearings 52 and 56, but as the ring flattens of course the strut will be shortened and the flexing thereof will result.

In order to transmit the flexing of the strut 50 as an indication of the applied pressure a forked yoke member 60 is attached to the hub 55. This yoke member is best seen in front elevation in Fig. 2 and has the legs 61 and 62 thereon which are spaced apart and extend downwardly from the stud 57 to a point closely adjacent the lower end of the strut 50. Each of these legs is provided with a slot 64 which receives a support pin 65 to which the flexible belt 66 is connected. This belt extends from one leg to the other and passes around a drum 67, which is carried by a spindle 68', extending into the stud 53. Suitable bearings 68 support this spindle so that it is free to turn individually of any compression or movement of the parts. The flexible belt 66 allows the necessary vertical movement of the parts upon compression of the ring 40.

In order that the flexing of the strut 50 may be readily observed a needle or indicator arm 16 is affixed to the drum 67 so that it will move across the dial 17 as seen in Fig. 1.

In order to protect the device against excessive pressures a stop pin 75 has been positioned on the lower part of the ring 40 and it may be adjusted as to position by the nuts 76 which will lock at any desired position. A tongue 77 on the ring 15 is arranged to abut such stop pin 75 to limit the flattening of the ring.

As seen in Fig. 4 the stud 57 may be held in position by a suitable locking nipple 78.

In operation pressure will be applied through the passage 5 to deflect the diaphragm 27. This forces fluid through the choke 25 to distort the diaphragm 28 and there is then a tendency to move the resilient plate 33. This pressure is distributed against the retainer discs 12 and the load pin 13, which is moved without any friction against the plates 12. This movement in turn raises the lug 41 to flatten the top and bottom of the compression ring and to move the stud 53 toward the stud 57. This shortens the distance between the studs 53 and 57 and tends to shorten the strut 50 and thus flexes the strut 50 and moves the yoke 60 through an arc which is a function of the amount of flexing of the strut. The movement of this yoke moves the belt 66 to rotate the drum 67 and moves the needle 16 so that the applied pressure is indicated. It seems obvious that friction losses have been avoided and that a minimum of movement of the parts has been accomplished.

What is claimed is:

1. A pressure gauge comprising a housing, a diaphragm therein adapted to be subjected to pressure, a rod member to ride on said diaphragm and to move therewith, a resilient ring member mounted in said housing and to be contacted by said rod member, a bowed strut positioned across said ring so as to flex upon distortion of said ring due to pressure from said rod, a pair of spaced arms fixed to one end of said strut, an indicator needle pivoted for oscillating movement, and means connecting said needle to said arms so that flexing of said strut moves said arms and said needle as a function of the applied pressure.

2. A pressure gauge including a spring ring member, a flexible bowed strut extending diametrically across said ring with its ends fixed thereto, an arm member fixed to one end of said strut so as to move through an arc in accordance with the flexing of said strut, needle means to indicate the amount of movement of said arm member, and means to distort said ring so as to tend to shorten the distance between the ends of said strut and effect a flexing thereof so that said needle indicates the magnitude of pressure causing distortion.

3. A pressure gauge including a spring ring member, a flexible bowed strut extending diametrically across said ring with its ends fixed thereto, an arm member fixed to one end of said strut so as to move through an arc in accordance with the flexing of said strut, needle means to indicate the amount of movement of said arm member, and means to distort said ring so as to tend to shorten the distance between the ends of said strut and effect a flexing thereof so that said needle indicates the magnitude of pressure causing distortion, said last means including a diaphragm.

4. A pressure gauge including a spring ring member, a flexible bowed strut extending diametrically across said ring with its ends fixed thereto, an arm member fixed to one end of said strut so as to move through an arc in accordance with the flexing of said strut, needle means to indicate the amount of movement of said arm member, and means to distort said ring so as to tend to shorten the distance between the ends of said strut and effect a flexing thereof so that said needle indicates the magnitude of pressure causing distortion, said last means including a diaphragm and a choke means for a liquid body to damp the action of said diaphragm.

5. In a pressure gauge of the character described, a ring of spring material, means to apply pressure thereto to distort said ring, oppositely disposed supports carried by said ring, a bowed strut, a hub on the ends of said strut, means to mount said hubs on said supports so that said strut will be flexed with the distortion of said ring.

6. A pressure gauge indicator assembly comprising an annular member which is radially compressible, a diametrical bowed strut thereon, and means operable as a function of the flexing of said strut upon compression of said member to indicate the applied pressure.

7. In a pressure gauge a compression ring portion, oppositely disposed studs thereon, a bearing on each stud, a bowed strut having end portions to receive each bearing, said strut being flexible to bend upon compression of said ring portion, and means actuated by the flexing of said strut to indicate the pressure causing compression.

8. In a pressure gauge a compression ring portion, oppositely disposed studs thereon, a bearing on each stud, a bowed strut having end portions to receive each bearing, said strut being flexible to bend upon compression of said ring portions, and means actuated by the flexing of said strut to indicate the pressure causing compression, said means including a forked yoke fixed to one end of said strut, a flexible belt connecting said forks, and an indicator member movable by said belt.

9. A pressure gauge including a load ring to receive the thrust of the pressure being gauged, a bowed strut across said ring to be flexed as the ring yields to a transverse pressure tending to flatten the ring, and an indicating mechanism operable in accordance with the flexing of said strut as an indication of the applied pressure.

10. A pressure gauge including a load ring to receive the thrust of the pressure being gauged, a bowed strut across said ring to be flexed as the ring yields to a transverse pressure tending to flatten the ring, an indicating mechanism operable in accordance with the flexing of said strut as an indication of the applied pressure, a load member to transmit the force of the applied pressure to said ring and strut, and apertured resilient disc shaped means firmly held at its periphery threaded on the load member but unattached thereto to move under applied pressure to be gauged in substantial unison with the load member so as to leave the load member free for accurate movement.

11. In a pressure gauge the combination of a casing, a load rod therein, flexible means encircling said rod and mounted to flex under pressure, and means to apply the pressure to be gauged to each said rod and said means so that the independent movement of the rod and means adjacent the rod is substantially in unison.

12. In a pressure gauge, a diaphragm to which the pressure to be gauged is applied, a load pin extending from the central portion of the diaphragm and movable thereby, an apertured plate capable of flexing, closely fitting about said pin but unattached thereto and unaffected thereby, and means providing a bearing shoulder for the periphery portion of said plate, whereby the plate will flex with the diaphragm and move with the load pin and retain said diaphragm against distortion or rupture in the area about the end of the load pin.

13. In a pressure gauge, means to which the pressure to be gauged is applied, a load pin contacting said means and movable thereby, an apertured plate fitting about said pin but unattached thereto and unaffected thereby, and means to confine the periphery portion of said plate, whereby the plate will move with said first means and move with the load pin so as to provide for frictionless movement of the load pin due to the substantially identical movement therewith in the area about the end of the load pin.

14. In a pressure gauge, the combination of a load rod movable in response to applied pressure, apertured resilient means firmly held at its periphery closely encircling said rod to confine the same and adapted to flex under pressure and move independent of said load rod, and means to apply the pressure to be gauged to said rod and resilient means so that the independent movement of the rod and resilient means is substantially in unison.

15. In a pressure gauge, the combination of a load rod movable in response to applied pressure, a resilient apertured plate firmly held at its periphery closely encircling said load rod to confine the same and adapted to flex under pressure and move independent of the load rod, and means to apply the pressure to be gauged to said load rod and plate so that the independent movement of the rod and plate is substantially in unison.

16. In a pressure gauge, the combination of a load rod movable in response to applied pressure, a resilient apertured disc-shaped means firmly held at its periphery closely encircling said load rod to confine the same and adapted to flex under pressure and move independent of the load rod, means to apply the pressure to be gauged to said load rod and resilient means so that the independent movement of the load rod and resilient means is substantially in unison, and an indicator operable by the load rod to indicate the applied pressure.

17. In a pressure gauge, a load pin, a diaphragm to which the pressure being gauged is applied, said diaphragm being flexible and incapable of withstanding the unit area pressure applied thereto, and resilient means closely fitting about said pin and unattached thereto but having its periphery fixed whereby said means will flex with the diaphragm and move with the load pin to retain said diaphragm against distortion or rupture in the area about the end of the load pin.

18. In a diaphragm construction for pressure gauges where pressure is applied to the diaphragm and the movement or flexing of the diaphragm utilized as an indication of the applied pressure, a diaphragm which would become distorted or ruptured under the applied pressure if not retained, a load pin to contact a relatively small area of the diaphragm adjacent the center, and resilient means closely encircling said pin to receive the load pin but having its periphery fixed whereby said means will flex with the diaphragm as said load pin moves so that the diaphragm will be confined and there will be no relative movement between the periphery of the load pin and said means.

HERBERT ALLEN.